(12) United States Patent
Mitchell

(10) Patent No.: US 8,584,411 B2
(45) Date of Patent: Nov. 19, 2013

(54) FLOATING FLAPPER VALVE

(75) Inventor: Michael D. Mitchell, Woodstock, GA (US)

(73) Assignee: Alcoa Inc., Pittsburgh, PA (US)

( * ) Notice: Subject to any disclaimer, the term of this patent is extended or adjusted under 35 U.S.C. 154(b) by 182 days.

(21) Appl. No.: 13/297,871

(22) Filed: Nov. 16, 2011

(65) Prior Publication Data

US 2013/0118101 A1 May 16, 2013

(51) Int. Cl.
*E06B 7/14* (2006.01)

(52) U.S. Cl.
USPC .......... 52/209; 52/302.1; 52/302.6; 52/302.7; 52/741.1

(58) Field of Classification Search
USPC .............. 52/209, 302.1, 302.6, 302.7, 741.1; 454/196; 160/44; 49/406, 408, 504; 137/192, 204
See application file for complete search history.

(56) References Cited

U.S. PATENT DOCUMENTS

| | | | |
|---|---|---|---|
| 1,291,511 A * | 1/1919 | Hester | 454/196 |
| 1,451,021 A * | 4/1923 | Hanson | 52/1 |
| 2,827,674 A * | 3/1958 | Hanck | 49/395 |
| 3,314,201 A * | 4/1967 | Riegelman | 52/209 |
| 3,410,027 A * | 11/1968 | Bates | 49/471 |
| 3,466,819 A * | 9/1969 | Giger | 52/1 |
| 3,503,169 A * | 3/1970 | Maki et al. | 52/209 |
| 3,693,801 A * | 9/1972 | Pogonowski | 210/242.3 |
| 3,845,599 A * | 11/1974 | Jolly | 52/209 |
| 4,003,171 A * | 1/1977 | Mitchell | 52/209 |
| 4,475,324 A * | 10/1984 | Flakk | 52/209 |
| 4,627,206 A * | 12/1986 | Cox | 52/209 |
| 4,644,717 A * | 2/1987 | Biebuyck | 52/209 |
| 4,691,487 A * | 9/1987 | Kessler | 52/209 |
| 5,123,212 A * | 6/1992 | Dallaire et al. | 52/209 |
| 5,129,110 A * | 7/1992 | Richter | 4/324 |
| 5,787,659 A | 8/1998 | Rinehart | |
| 5,822,934 A * | 10/1998 | O'Donnell | 52/209 |
| 5,887,387 A * | 3/1999 | Dallaire | 49/408 |
| 6,357,186 B1 * | 3/2002 | Gould | 52/209 |
| 6,374,557 B1 | 4/2002 | O'Donnell | |
| 6,692,187 B2 * | 2/2004 | Sprengle et al. | 405/92 |
| 7,600,944 B1 * | 10/2009 | Keating | 405/96 |
| 7,730,679 B2 * | 6/2010 | Eckenswiller et al. | 52/209 |
| 7,891,028 B1 * | 2/2011 | Camargo et al. | 4/393 |
| 8,375,664 B2 * | 2/2013 | Gower et al. | 52/302.1 |
| 2012/0028564 A1 * | 2/2012 | Kelly | 454/275 |

OTHER PUBLICATIONS

Kawneer Company, Inc., AA®3350™ IsoPort Window, "www.kawneer.com/kawneer/ . . . /Window . . . /AA3350_Window-F.pdf", 2010 (2 pages).

* cited by examiner

*Primary Examiner* — Robert Canfield
*Assistant Examiner* — Matthew Gitlin
(74) *Attorney, Agent, or Firm* — Greenberg Traurig, LLP

(57) ABSTRACT

An apparatus for increasing the insulation value of a window system with a weep hole includes a flapper valve with a buoyant flap articulating relative to a non-moving portion. The flap is positioned on the window frame over the weep hole proximate the inside of the structure in which the window system is installed and the non-moving portion is attached to the window frame. The flap may be held against the frame around the weep hole by gravity and/or by the elastic memory of a portion of the flap, such as a plastic hinge. The flapper valve is closed when dry to diminish the flow of ex-filtration through the weep hole, but opens in response to being flooded with water due to the buoyancy of the flap, opening the weep hole and allowing the water to drain.

18 Claims, 7 Drawing Sheets

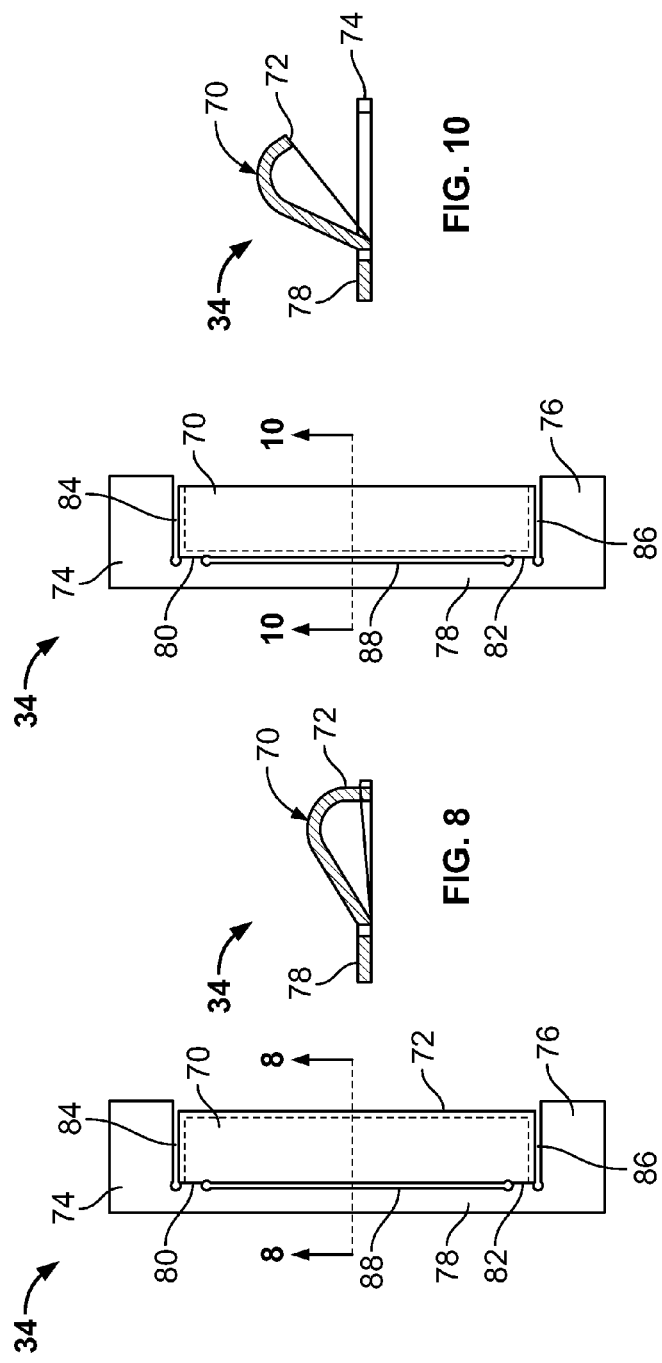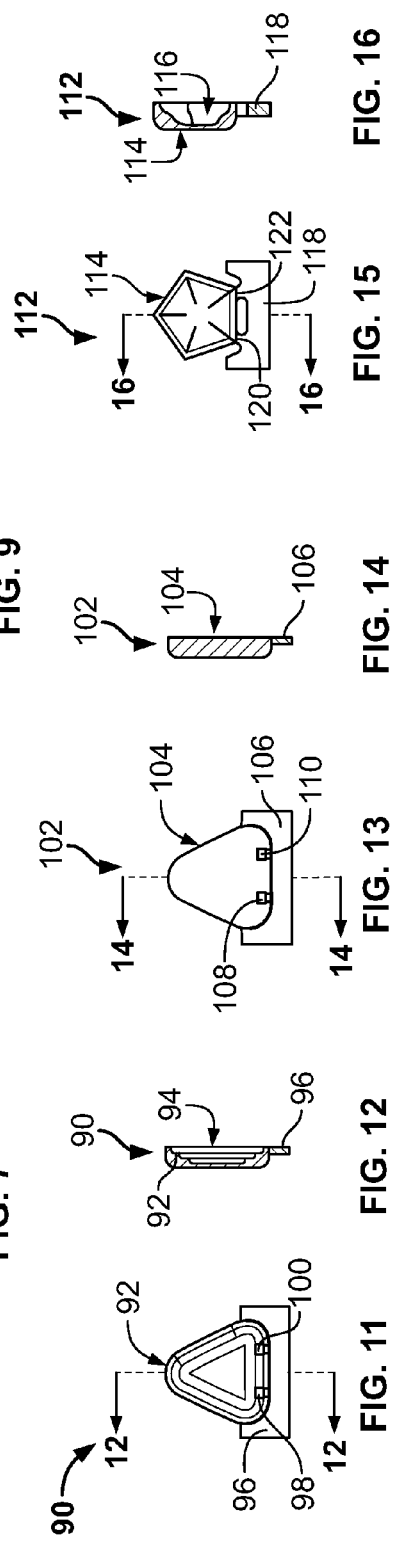

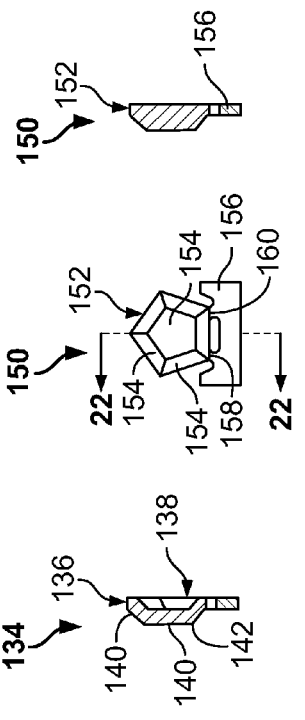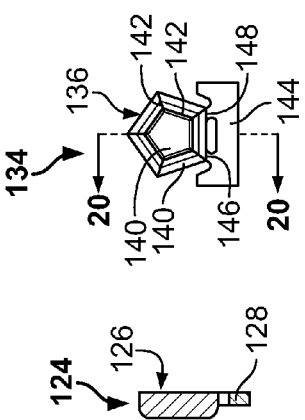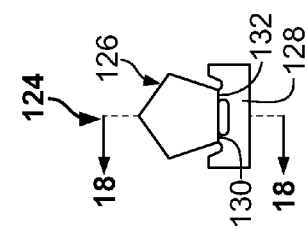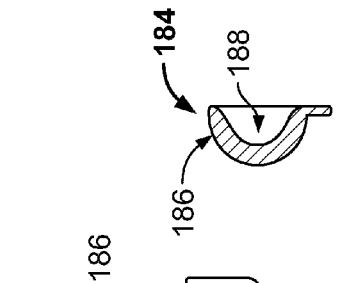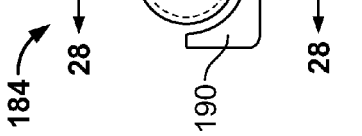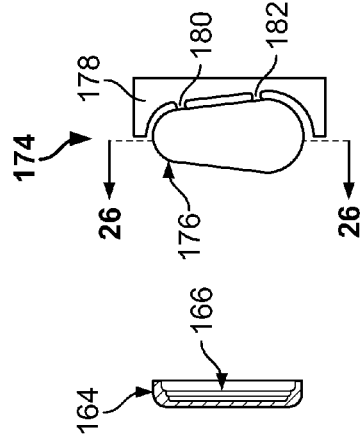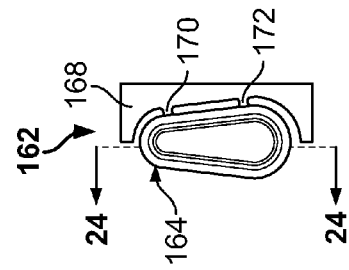

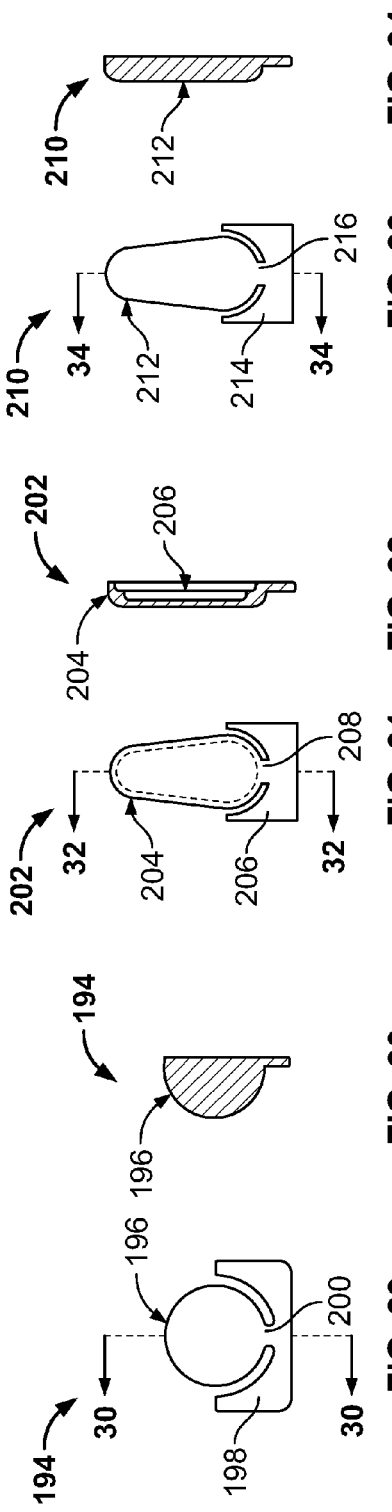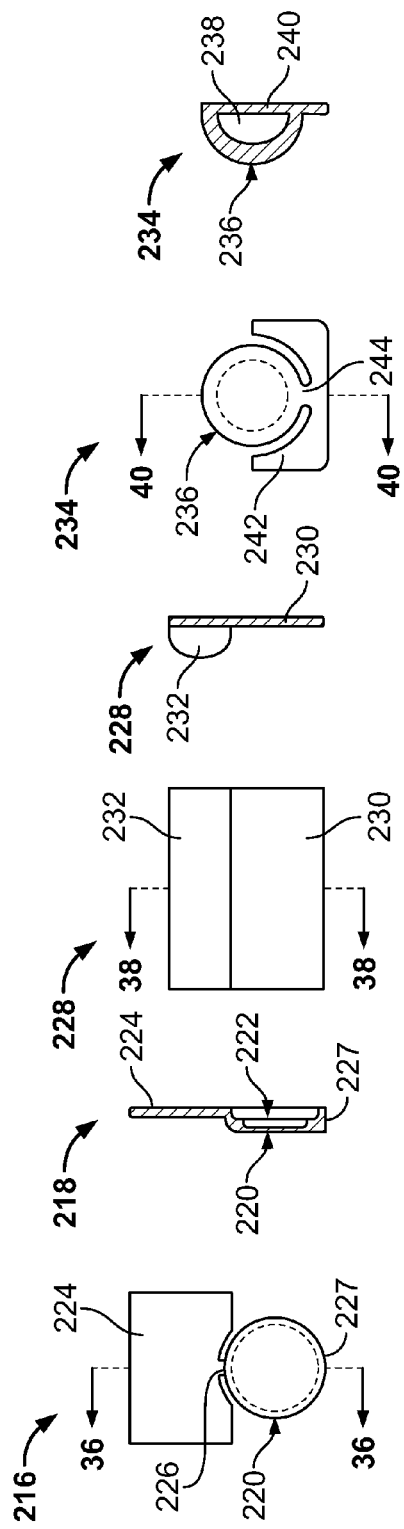

US 8,584,411 B2

FLOATING FLAPPER VALVE

FIELD

The present invention relates to fenestration systems such as curtain walls, sliding doors and windows, window frames and window assemblies, and more particularly, to weep holes in afore mentioned window frames that allow moisture that penetrates the window assembly to be discharged to the environment.

BACKGROUND

Windows of various types are subject to air and water intrusion. In the case of water intrusion, window systems typically incorporate a drainage system, which includes one or more weep holes to allow the water to escape to prevent damage, such as corrosion, mold, deterioration of window seals, etc. While weep holes perform a beneficial drainage function, they can also allow air and energy infiltration and ex-filtration past the window system and consequent energy inefficiency, e.g., due to the gain or loss of heat into a building in which the window system is installed. Improvements in window systems remain desirable.

SUMMARY

The disclosed subject matter overcomes the disadvantages and shortcomings of the prior art by providing a valve for effecting the flow of air through a weep hole in a window or building structure. The valve features a non-articulating portion securable to the structure proximate the weep hole and an articulating portion secured to the non-articulating portion. The articulating portion articulates relative to the non-articulating portion and the structure, between a closed position covering and at least partially obstructing flow of air through the weep hole and an open position, permitting the flow of water through the weep hole. The articulating portion is buoyant in water and floats in response to partial or complete submersion in water to transition from the closed position to the open position.

BRIEF DESCRIPTION OF THE DRAWINGS

For a more complete understanding of the present invention, reference is made to the following detailed description of exemplary embodiments considered in conjunction with the accompanying drawings.

FIGS. 7-40 show multiple embodiments of flapper valves in accordance with the present disclosure, with the odd numbered figures, e.g., FIG. 7, being plan views and the next succeeding even-numbered figure, e.g., FIG. 8, being a cross-sectional view of the preceding figure, e.g., FIG. 7, taken along the section line indicated, e.g., section line 8-8, and looking in the direction of the arrows.

DETAILED DESCRIPTION OF EXEMPLARY EMBODIMENTS

Figure 1:
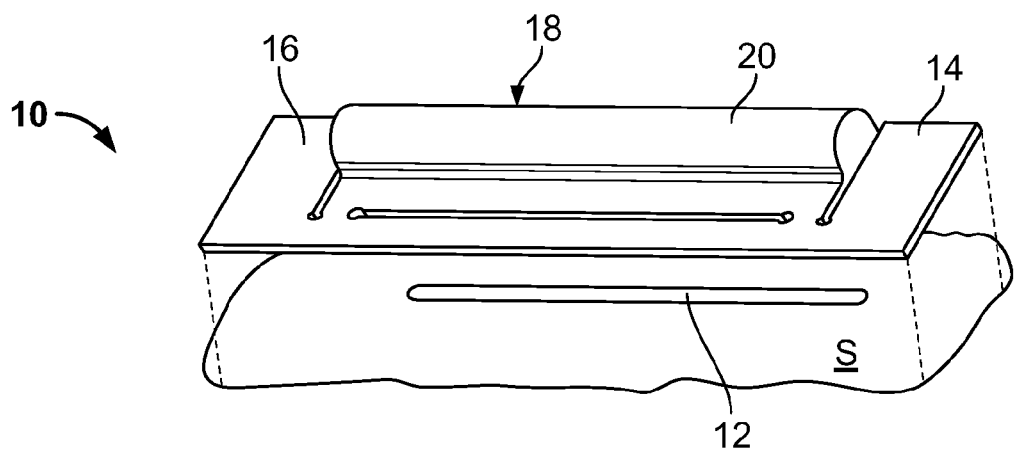
FIG. 1 is a perspective view of a flapper valve in accordance with an embodiment of the present disclosure.
Figure 2:
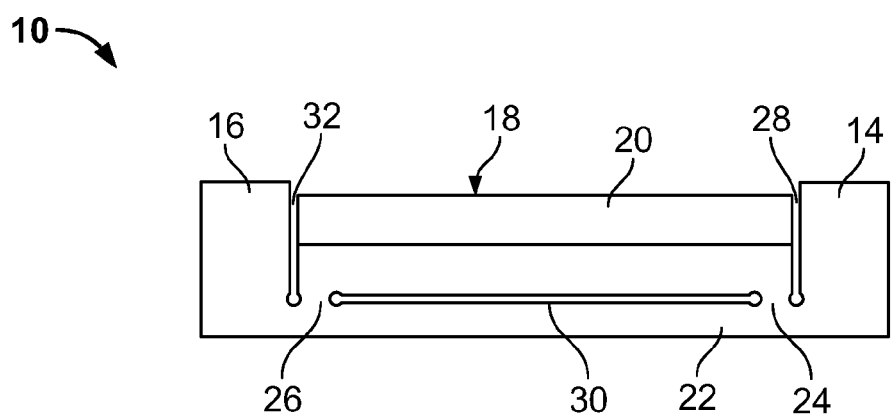
FIG. 2 is a top view of the flapper valve of FIG. 1.
Figure 3:
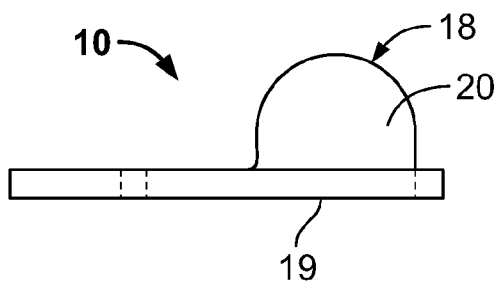
FIG. 3 is a side view of the flapper valve of FIGS. 1 and 2.

FIGS. 1-3 show a flapper valve 10. The flapper valve 10 may be positioned proximate a surface S, such as a surface within a window frame, having a weep hole or slot 12 therein, to cover the weep hole 12. The flapper valve 10 has a pair of end portions 14, 16 which may be used to affix the flapper valve 10 to the surface S, such that a movable flap portion 18 of the flapper valve 10 covers the slot 12 and the bottom surface 19 thereof makes contact with the surface S circumscribing the weep hole 12. Weep holes may have a variety of shapes, including circular, square, oblong or rectangular or may be an elongated slot. For the purposes of this disclosure, the term "weep hole" will encompass a weep hole having any shape. The end portions 14, 16 may be attached to the surface, e.g., by mechanical means, screws, rivets, an overlying plate, adhesive, etc. (not shown). The flapper valve 10, may be formed, e.g., by injection molding, cast, film assembly, 3D printing, blow molding, extrusion, thermoforming, autoclaving, hot pressing, or pultrusion of a flexible material, such as, low durometer EPDM rubber, silicones, thin vellum film, polyethylene, polyvinyl chloride, polypropylene, polyethylene terephthalate, polymethylmethacrylate, polycarbonate, acrylonitrile butadiene styrene, polyimide, polyamide, polysulfone, polyamide-imide, PolyTetraFluoroEthylene, Polyether Imide, PolyEtherEther-Ketone, polyaryletherketone, or polyester. The flap portion 18 may be provided with a float portion 20, which may be integral there with or attached via an adhesive, thermal bonding, mechanical interlocking, e.g., via snaps, screws or rivets, or the like. The flap portion 18 is attached to an edge portion 22 by plastic hinges 24, 26, which are delimited by slots 28, 30, 32. The specific gravity of at least the float portion 20 or, optionally, the flap portion 18 or, optionally, the entire flapper valve 10, is less than water. If the float portion 20 is formed from materials with a specific gravity greater than one, it may be formed into a structure that is equal to the weight of the volume of water which is displaced by that structure, e.g., the float 20 may be hollow and/or have an air inclusion(s). When the flapper valve 10 is secured to a surface, such as surface S, i.e., at the end portions 14, 16 and/or the edge portion 22, and partially or fully submerged in water, the float portion 20 and, due to attachment to the float portion 20 and/or to the specific gravity of the flap portion 18, the flap portion 18 will be urged upward by buoyancy in water, pivoting on plastic hinges 24, 26. The float portion 20 is dimensioned to provide adequate buoyancy to overcome its weight, the weight of the flap portion 18, and the elastic resistance of the plastic hinges 24, 26 to lift the flap portion 18 away from its rest position over the weep hole 12 when it is submerged wholly or partially in water, allowing the water to drain through the weep hole 12.

Figure 4:
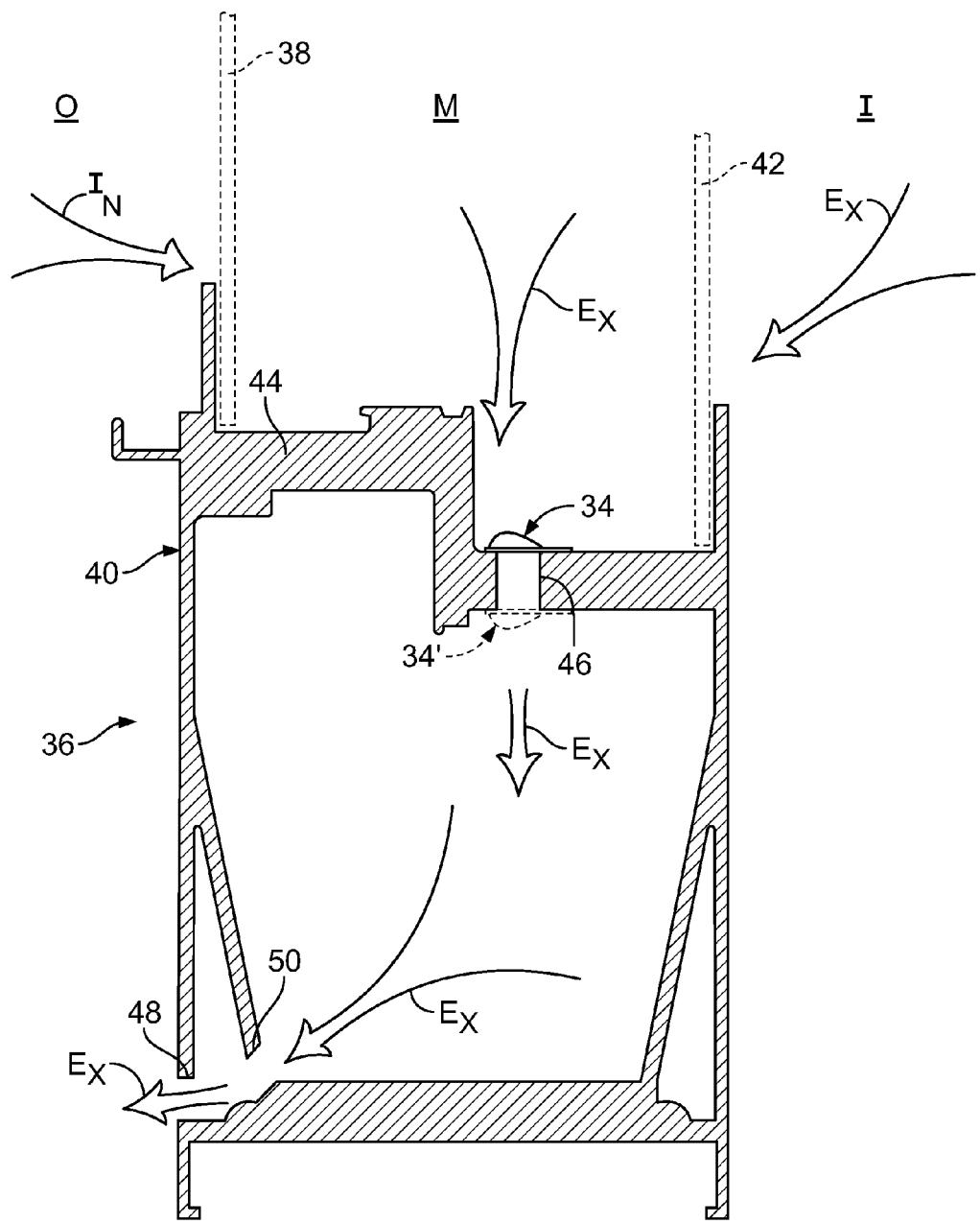
FIG. 4 is a diagrammatic view of a window system in accordance with another embodiment of the present disclosure having a flapper valve and in a dry state.

FIG. 4 diagrammatically shows the operation of a flapper valve 34 in accordance with the present disclosure when installed in a window system 36. Note that flapper valve 34 has a different shape than flapper valve 10 described above and depicted in FIGS. 1-3. Notwithstanding, flapper valve 34 operates similarly to flapper valve 10, as will be described more fully below in reference to FIGS. 7-10. The window system 36 has a first weather barrier 38 diagrammatically depicted in dotted lines, which may represent one or more window layers, which may have intervening air or inert gas layers, mounted in a sash. The first weather barrier 38 may be movable or stationary relative to a window frame 40. A second weather barrier 42, like an inside window, is depicted diagrammatically in dotted lines and may also be provided to form a more weather-impenetrable window system 36. The second weather barrier 42 may be moveable or stationary. The window frame 40 includes a bottom sill 44 and cooperates with the first weather barrier 38 and the second weather barrier 42 to selectively exclude the elements from the structure (not shown) in which it is installed. The window system 36 is typically intended to prevent precipitation and intemperate air present on the outside O of a structure from passing through the window system 36 to the inside I of the structure. While window systems can be effective in shielding the inside of a structure from the weather present outside a structure, it is common for some infiltration to take place. For example, wind and wind-driven rain may breach (infiltrate) the interface between the window frame 40 and the first weather barrier 38, e.g., as shown by arrow $I_N$. This may be partially due to a pressure differential between the environment outside O and the environment inside I and/or to a pressure differential between the outside O and an intermediate environment M between the first and second weather barriers 38, 42. For example, the force of wind directed at the window system 36 may result in a higher pressure outside O than exists inside I or in the intermediate environment M. An insufficiency of sealing between the window frame 40 and the first weather barrier 38 may also increase the amount of infiltration that occurs. As shown in FIG. 4, the window system 36 may be provided with one or more weep holes or slots 46, 48, 50, which allow precipitation that breaches the window system 36 due to infiltration to drain to the outside O.

Besides allowing infiltration of outside air and precipitation, window systems also frequently allow ex-filtration flow represented by arrows $E_X$ in FIG. 4. Ex-filtration represents the loss of temperate air from inside I the structure or from the intermediate space M, e.g., air that has achieved a comfortable temperature level through heating or cooling by HVAC systems in a structure. Ex-filtration may be increased as a result of a pressure differential between the outside O and the inside I and/or the intermediate space M. For example, if the window system 36 is installed on the leeward side of a building (as defined by a given wind), a lower pressure may develop on the outside O relative to the inside I of the structure and/or the intermediate space M. A low pressure condition on the outside O of the window system 36 will tend to draw air from the inside I or the intermediate space M to the outside O. The withdrawal of temperate air from the inside of a building induces the entry of intemperate air to replace it, e.g., via other entry points of outside air, such as other doors, vents and windows in the building. Ex-filtration can occur, in part, by air passing from the inside I or intermediate space M to the outside O via weep holes/slots, e.g., 46, 48, 50 in FIG. 4. In accordance with the present disclosure, one or more of the weep holes/slots 46, 48, 50 are covered by a flapper valve 34 when the flapper valve 34 is in a rest/closed (dry) condition. In the dry condition, the flapper valve 34 would close and act as a barrier to ex-filtration $E_X$, which would otherwise occur if the flapper valve 34 were not present, as shown by arrows $E_X$. More particularly, FIG. 4 illustrates the ex-filtration flows $E_X$ that would be present if the flapper valve 34 was open or was not there. The presence of the flapper valve 34 in the closed position would significantly curtail or stop the ex-filtration flows $E_X$ shown. The flapper valve 34 may therefore prevent the loss of climate-controlled air from inside I a structure or from the intermediate area M, through the weep hole 46, to the outside O. In addition to curtailing ex-filtration, assuming the existence of a second weather barrier 42 defining an intermediate space M, the presence of the flapper valve 34 tends to maintain pressure within the intermediate space M to limit infiltration $I_N$. More particularly, wind/air may infiltrate as shown at $I_N$, but once the intermediate space M is pressurized by the wind, further infiltration and ex-filtration of the infiltrated air is curtailed by the closed flapper valve 34, which blocks the weep hole 46, curtailing the pressurized air from leaving the intermediate space M and curtailing additional infiltrating air from entering the space M. Similarly, infiltration can occur through a reverse flow (from outside O to intermediate space M) through the weep holes 48, 50, 46 (with the infiltrating air opening the flapper valve 34), but the flapper valve 34 will act as a one way valve, letting pressurized air into space M, but closing and curtailing or preventing ex-filtration through the flapper valve 34 to the outside. Optionally, a second flapper valve 34' (shown in dotted lines) may be attached on a surface exterior to the intermediate space M to the cover the weep hole 46 when dry, to inhibit infiltration through the weep hole 46.

Figure 5:
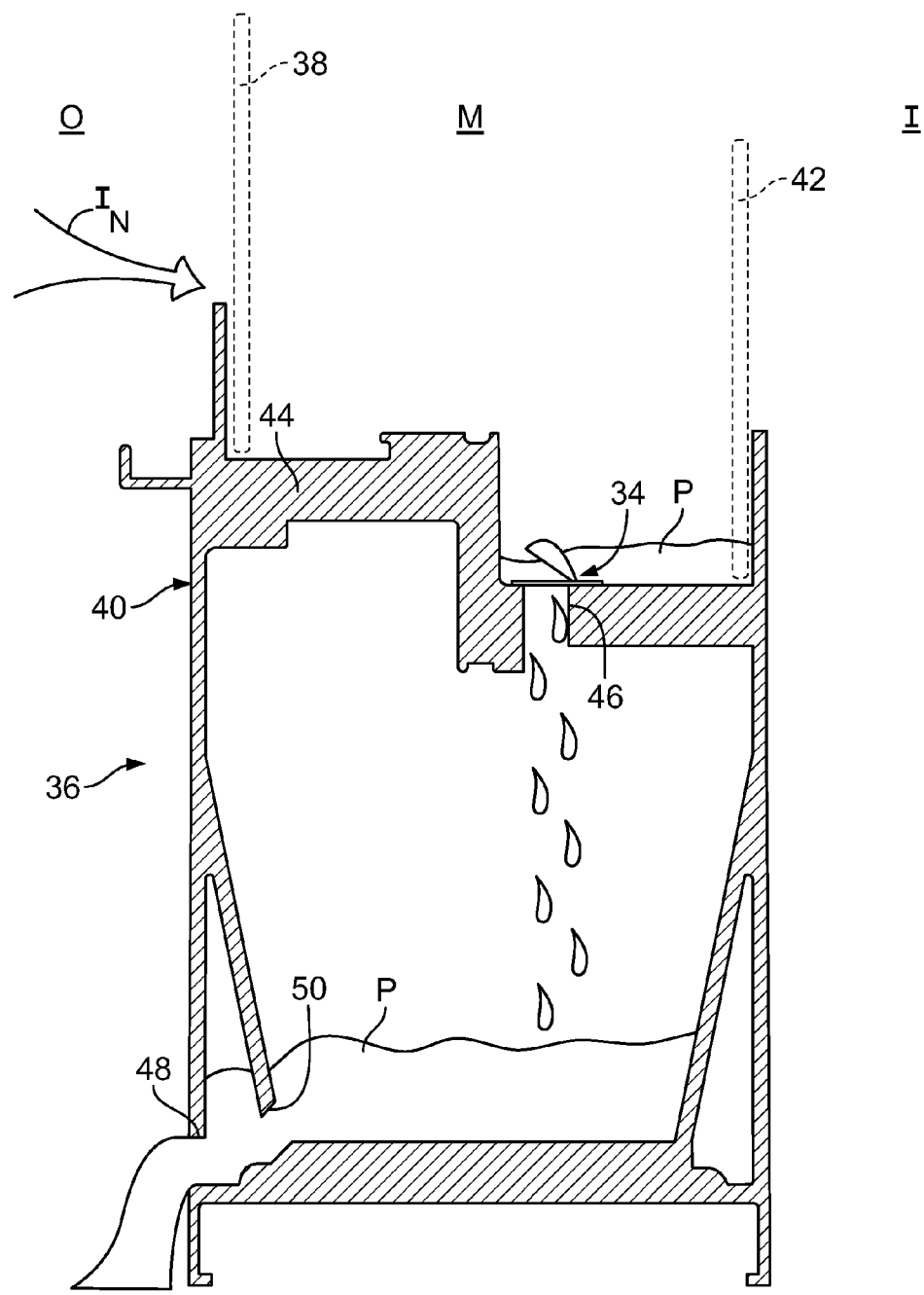
FIG. 5 is a diagrammatic view of the window system of FIG. 4 in a wet state.

FIG. 5 illustrates the operation of the flapper valve 34 under conditions resulting from the infiltration of precipitation P into the intermediate space M and onto sill 44, i.e., as a result of penetrating the interface between the window frame 40 and the first weather barrier 38. In the event of the infiltration of precipitation, the precipitation P collects around the flapper valve 34, causing the valve to open due to the buoyancy of the flap portion 70 (see FIGS. 7-10 and description below), allowing the precipitation P to drain thorough weep hole 46 into the interior of the window frame 40 and from there, through weep holes/slots 48, 50 to the outside O.

Figure 6:
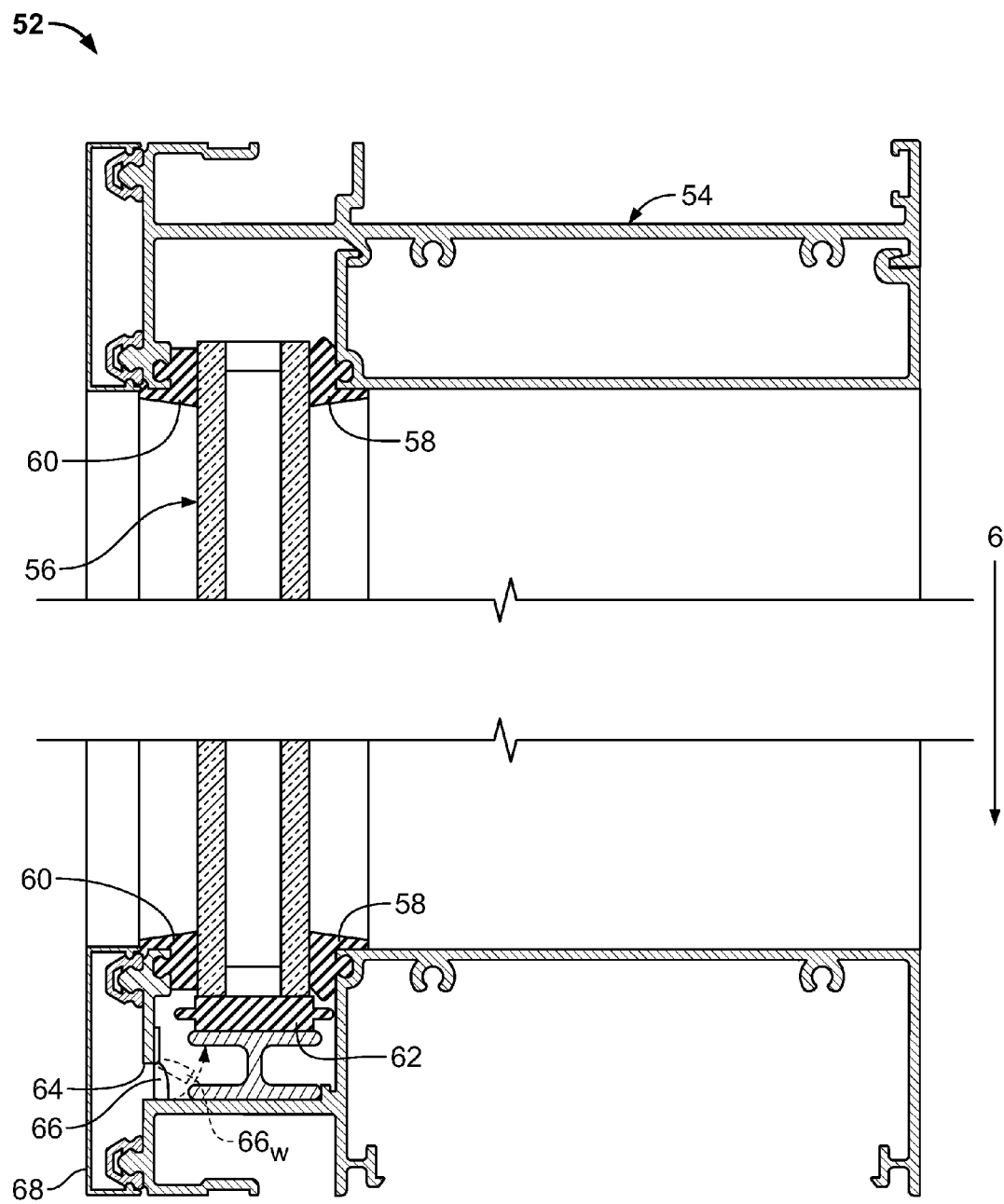
FIG. 6 is a cross-sectional view of a window system having a flapper valve in accordance with another embodiment of the present disclosure.

FIG. 6 shows a window system 52 with a frame 54. A double-pane glass unit 56 is held within the frame 54 between gaskets 58, 60, 62. A weep hole 64 is covered when in the dry state by a flapper valve 66. In the event that precipitation (or atmospheric moisture that condenses) penetrates the interface between the gasket 60 and the glass unit 56, the flapper valve 66 can pivot to position 66W, due to buoyancy, when fully or partially submerged in the moisture, to allow the moisture to drain through weep hole 64. A second weep hole 68 in the frame 54 allows the moisture to drain from the frame 54. The glass unit 56 is oriented approximately parallel to the gravitational force G, and the flapper valve is attached to the frame 54 above the weep hole 64 and depends down over the hole 64 when in a dry condition to prevent ex-filtration as in the embodiment of the present disclosure shown in FIGS. 4 and 5 and described above. In FIGS. 4 and 5, the flapper valve 34 is disposed over a weep hole 46 in a surface which is about perpendicular to the force of gravity. As can be understood from the embodiments shown in FIGS. 4, 5 and 6, the surface through which the weep hole, e.g., 46, 64 penetrates can be oriented at a variety of angles relative to the gravitational force (plumb). By implication, a flapper valve, e.g., 34, 66 in accordance with the present disclosure may be oriented at a variety of angles relative to plumb to cover an associated weep hole, e.g., 46, 64 in a given surface having a given orientation relative to plumb. In instances where the flapper valve, e.g., 66 operates in close proximity to a structure, such as frame 54 in FIG. 6, the flapper valve 66 may incorporate a flat, like flat 227 of the flapper valve 218 shown in FIGS. 35 and 36, to allow it to clear the structure, i.e., when transitioning between the open and closed positions.

FIGS. 7-10 illustrate the flapper valve 34 shown in FIGS. 4 and 5, which includes a flap portion 70, which is generally hollow in cross-section and defines a peripheral lip 72 on three sides thereof. The flap portion 70 is attached to non-moving portions 74, 76, 78 by plastic hinges 80, 82 as delimited by slots 84, 86, 88. FIGS. 7 and 8 show the flapper valve 34 in the closed state, which would correspond to the dry condition. FIGS. 9 and 10 show the flapper valve 34 in the open state, which would correspond to the wet condition, wherein the flap portion 70 would be raised by its buoyancy in water from the surface proximate a weep hole, e.g., 46 of FIGS. 4 and 5, which it would cover in the dry state, the buoyant lifting action allowing drainage to occur. Note that in the embodiment shown in FIGS. 7-10, the flap portion 70 may be formed from a buoyant material, such as, low durometer EPDM rubber or silicones, thin vellum film, polyethylene, polyvinyl chloride, polypropylene, polyethylene terephtalate, polymethylmethacrylate, polycarbonate, acrylonitrile butadiene styrene, polyimide, polyamide, polysulfone, polyamide-imide, PolyTetraFluoroEthylene, Polyether Imide, PolyEtherEther-Ketone, polyaryletherketone, or polyester that may be cast, film assembled, 3D printed, blow molded, extruded, thermoformed, autoclaved, hot pressed, or formed by pultrusion.

FIGS. 11 and 12 show a flapper valve 90 in accordance with an embodiment of the present disclosure wherein the flap portion 92 has a stepped internal hollow 94 and an approximately triangular shape when viewed from the top. The flap portion 92 is connected to a non-moving portion 96 by a pair of plastic hinges 98, 100. The non-moving portion 96 would be adhered or otherwise affixed near a weep hole 46.

FIGS. 13 and 14 show a flapper valve 102 in accordance with an embodiment of the present disclosure wherein the flap portion 104 is solid and an approximately triangular shape when viewed from the top. The flap portion 104 is connected to a non-moving portion 106 by a pair of plastic hinges 108, 110.

FIGS. 15 and 16 show a flapper valve 112 in accordance with an embodiment of the present disclosure wherein the flap portion 114 has an internal hollow 116 and an approximately pentagonal shape when viewed from the top. The flap portion 114 is connected to a non-moving portion 118 by a pair of plastic hinges 120, 122.

FIGS. 17 and 18 show a flapper valve 124 in accordance with an embodiment of the present disclosure wherein the flap portion 126 is solid and has an approximately pentagonal shape when viewed from the top. The flap portion 126 is connected to a non-moving portion 128 by a pair of plastic hinges 130, 132.

FIGS. 19 and 20 show a flapper valve 134 in accordance with an embodiment of the present disclosure wherein the flap portion 136 has an internal hollow 138 and an approximately pentagonal shape when viewed from the top. The exterior surface of the flap portion 136 features facets 140 attributable to edges 142. The flap portion 136 is connected to a non-moving portion 144 by a pair of plastic hinges 146, 148.

FIGS. 21 and 22 show a flapper valve 150 in accordance with an embodiment of the present disclosure wherein the flap portion 152 is solid and has an approximately pentagonal shape with facets 154 like the flapper valve 134 shown in FIGS. 19 and 20. The flap portion 152 is connected to a non-moving portion 156 by a pair of plastic hinges 158, 160.

FIGS. 23 and 24 show a flapper valve 162 in accordance with an embodiment of the present disclosure wherein the flap portion 164 has an internal, stepped hollow 166 and is approximately ovoid in shape when viewed from the top. The flap portion 164 is connected to a non-moving portion 168 by a pair of plastic hinges 170, 172.

FIGS. 25 and 26 show a flapper valve 174 in accordance with an embodiment of the present disclosure wherein the flap portion 176 is solid and is approximately ovoid in shape when viewed from the top. The flap portion 176 is connected to a non-moving portion 178 by a pair of plastic hinges 180, 182.

FIGS. 27 and 28 show a flapper valve 184 in accordance with an embodiment of the present disclosure wherein the flap portion 186 has an internal hollow 188 and an approximately hemispheric shape. The flap portion 186 is connected to a non-moving portion 190 by a single plastic hinge 192.

FIGS. 29 and 30 show a flapper valve 194 in accordance with an embodiment of the present disclosure wherein the flap portion 196 is solid and approximately hemispheric in shape. The flap portion 194 is connected to a non-moving portion 198 by a single plastic hinge 200.

FIGS. 31 and 32 show a flapper valve 202 in accordance with an embodiment of the present disclosure wherein the flap portion 204 has an internal hollow 206 and an approximately ovoid shape when viewed from the top. The flap portion 204 is connected to a non-moving portion 206 by a single plastic hinge 208.

FIGS. 33 and 34 show a flapper valve 210 in accordance with an embodiment of the present disclosure wherein the flap portion 212 is solid and approximately ovoid in shape. The flap portion 212 is connected to a non-moving portion 214 by a single plastic hinge 216.

FIGS. 35 and 36 show a flapper valve 218 in accordance with an embodiment of the present disclosure wherein the flap portion 220 has an internal hollow 222 and an approximately circular shape when viewed from the top. The flap portion 220 is connected to a non-moving portion 224 by a single plastic hinge 226. A flat 227 may be formed in the periphery of the flap portion 220 to allow the flap portion 220 to clear a proximate structure when opening and closing.

FIGS. 37 and 38 show a flapper valve 228 in accordance with an embodiment of the present disclosure, which features a thin film 230, e.g., made from vellum, Mylar, polyethylene, polyvinyl chloride, polypropylene, polyethylene terephtalate, polymethylmethacrylate, polycarbonate, acrylonitrile butadiene styrene, polyimide, polyamide, polysulfone, PAI, PTFE, PEI, PEEK, PEAK, or polyester to which a buoyant element 232 made from Ethafoam, cross-linked polyethylene, polyester polyurethane, Styrofoam SP, Rohacell 51, Conticell, Styrofoam IB, De-Q-cell, Termanto, Polyfoam Plus, Nomex Aramid Honeycomb, polystyrene foams, AL foam is attached, e.g., by adhesives or thermo-bonding. The film 230 can be fastened or adhered to a surface proximate to a weep hole, e.g., like weep hole 46 of FIG. 4, such that the film 230 proximate the buoyant element 232 is disposed over the weep hole 46, occluding it in the dry state. Alternatively, film 230 can be installed in an orientation with the buoyant element 232 juxtaposed against the weep hole 46, occluding the weep hole 46 in the dry state. The thinness and suppleness of film 230 permits the film 230 to bend when the buoyant element 232 floats upon exposure to water, allowing the water to drain from the weep hole 46 covered by the flapper valve 228.

FIGS. 39 and 40 show a flapper valve 234 in accordance with an embodiment of the present disclosure wherein the flap portion 236 has an internal hollow 238 sealed by a wall 240. The sealed internal hollow 238 may contain a gas, such as air or Nitrogen that serves to reduce the overall specific gravity of the flap portion 236, making it more buoyant when in water. The flap portion 236 is connected to a non-moving portion 242 by a single plastic hinge 244.

The above-described embodiments show that that shape of the flapper valve, e.g., 10, 34, 90, 112, 162, 184 can be varied to suit the shape of the weep hole, e.g., 12, 46, the material of composition, and in response to other factors, such as, aesthetics and mechanical compatibility with/interference with window frame structures.

Testing has shown that a flapper valve, such as one described and illustrated in one of FIGS. 1-40, e.g., flapper valves, 10, 34, 90, 112, 162, 184, or one of the others disclosed herein, can substantially improve insulation value, e.g., the R-value of a window system in which it is used. For example, a standard Horizontal Sliding window without a flapper valve in accordance with the present disclosure and having dimensions 79 inches by 99 inches or 54 sq ft. was tested for air leakage through the window system in accordance with ASTM E283. Testing included ascertaining a tare value of air flow through the testing system (at 1.57 PSF and 6.24 PSF (pounds per square foot)) with the window system sealed by a membrane (polyester sheeting and duct tape). Having ascertained the tare leakage through the test rig, at 1.57 PSF and 6.24 PSF, the sealing membrane was removed from the window system (without flapper valve) and the leakage was measured again. At 1.57 PSF, which is approximately equivalent to a wind of twenty-five miles per hour, and at 6.24 PSF, which is approximately equivalent to a wind of fifty miles per hour, the air flow through the system was measured. The foregoing window system was then fitted with flapper valves in accordance with the present disclosure and of the type illustrated in FIGS. 8-10 installed over the weep holes and retested using the same testing apparatus. It was found that there was a 64 percent decrease in air flow at 1.57 PSF and an 82 percent decrease in air flow at 6.24 PSF. As can be appreciated from the foregoing, the presence of flapper valves in accordance with the present disclosure results in substantially curtailing air leakage through weep holes/slots in a window system on which they are installed. The observed curtailment of air leakage corresponds to an improvement in insulation value. Additionally, the water performance was not decreased by the presence of the flapper valves juxtaposed the weep slots.

It will be understood that the embodiments described herein are merely exemplary and that a person skilled in the art may make many variations and modifications without departing from the spirit and scope of the claimed subject matter. For example, hinges 24, 26 need not be plastic hinges, instead being pivot style hinges. In this case, the flapper valve could be formed from a more rigid material, so long as the buoyancy thereof lifts the flap portion 18 to allow drainage through the weep hole 12 when the flap portion 18 and/or float portion 20 is partially or fully submerged in water. While windows have been utilized above in the disclosure of the present application, the teachings of the present application could be applied to curtain walls, sliding doors, terrace doors, storefronts and other types of weather barriers having weep holes. While several of the flap valves, such as those shown in FIGS. 12 and 24 show stepped internal hollows, smooth hollows and constant wall thicknesses can be employed. All such variations and modifications are intended to be included within the scope of the present disclosure.

I claim:

1. A weep hole valve for a structure, comprising:
   a non-articulating portion securable to the structure proximate a weep hole;
   an articulating portion secured to the non-articulating portion and articulatable relative to the non-articulating portion between a closed position at least partially covering and at least partially obstructing a flow of air through the weep hole and an open position, permitting a flow of water through the weep hole, the articulating portion having buoyancy in water and floating in response to at least partial submersion in water to transition from the closed position to the open position
   wherein the structure is interposed between a first environment and a second environment and wherein a flow of air from the first environment to the second environment tends to open the valve and a flow of air from the second environment to the first tends to close the valve; and
   wherein the first environment is the out-of-doors and the second environment is an in-door space interior to a building, such that the valve curtails the exfiltration of air from the building.

2. The valve of claim 1, wherein the articulating portion is secured to the non-articulating portion by a flexible portion, the articulating portion being biased toward the closed position by the flexible portion and the buoyancy of the articulating portion overcoming the biasing of the flexible portion to transition from the closed position to the open position in response to partial or complete submersion in water.

3. The valve of claim 2, wherein the articulating portion has a cupped portion distal to the flexible portion, the cupped portion having a peripheral rim which contacts a surface of the structure at least partially surrounding the weep hole when in the closed state.

4. The valve of claim 1, wherein the articulating portion is biased towards the closed position at least partially due to the effect of gravity, the buoyancy of the articulating portion counteracting the weight of the articulating portion to open the valve when exposed to at least partial submersion in water.

5. The valve of claim 4, wherein the weep hole is in a surface of the structure that is plumb and the articulating portion hangs beside the surface and over the weep hole.

6. The valve of claim 4, wherein the weep hole is in a surface of the structure that is perpendicular to plumb and the articulating portion is positioned on top of the surface over the weep hole.

7. The valve of claim 1, wherein the valve permits passage of some water when in the closed position, but the passage of water is less than in the open position.

8. The valve of claim 7, wherein the passage of water when in the closed position is at least partially attributable to capillary action.

9. The valve of claim 1, wherein the structure includes a window system and the weep hole is in the window system.

10. The valve of claim 1, wherein the structure includes a window system with a first weather barrier proximate the first environment and a second weather barrier proximate the second environment, with an intermediate space between the first and second weather barriers capable of at least temporarily supporting a pressure differential between the intermediate space and the second environment, the valve functioning as a one way valve admitting infiltrating air from the first environment until the pressure within the intermediate space approximately equals or exceeds the first environment.

11. The valve of claim 1, wherein the valve is made from a low-durometer polymer.

12. The valve of claim 1, wherein the articulating portion has a float.

13. The valve of claim 12, wherein the articulating portion has a thin film to which the float is attached.

14. The valve of claim 12, wherein the float has an internal hollow.

15. The valve of claim 1, wherein the articulating portion has a relief on a peripheral surface thereof, the relief allowing the valve to clear an adjacent structure when the valve transitions between the open position and the closed position.

16. The valve of claim 1, wherein the valve has a peripheral shape when viewed from above of at least one of circular, triangular, oblong, ovoid, rectangular and pentagonal.

17. The valve of claim 1, wherein the weep hole is elongated and the valve is dimensioned to cover the weep hole.

18. A method for increasing the insulation value of a structure with a weep hole while preserving a water weeping function of the weep hole, the structure defining an interior space and an exterior space relative there to, comprising the steps of:
   a. obtaining a flap valve with a moveable buoyant flap
      b. attaching the flap valve to the structure on a surface proximate to the interior space and proximate to the weep hole, such that the flap covers the weep hole in a rest position, the flap at least partially obstructing the weep hole and curtailing a flow of ex-filtrating air through the weep hole when in the rest position and floating to a more open position when at least partially submerged in water to allow water to exit the weep hole
   wherein a flow of air from the exterior space to the interior space tends to open the valve and a flow of air from the interior space to the exterior space tends to close the valve; and wherein the exterior space is the out-of-doors and the interior space is an in-door space interior to a building, such that the flap valve curtails the exfiltration of air from the building.

* * * * *